Figure 4:
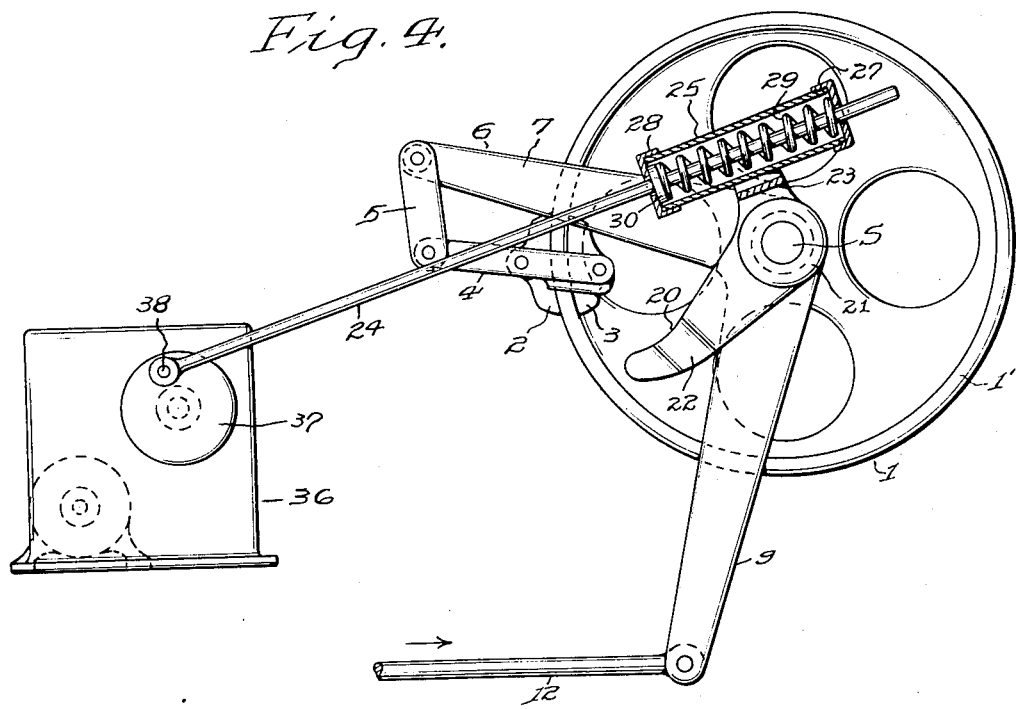

Feb. 6, 1934. T. H. FILMER 1,945,850
FUEL FEED CONTROL MECHANISM
Filed June 24, 1931 2 Sheets-Sheet 1
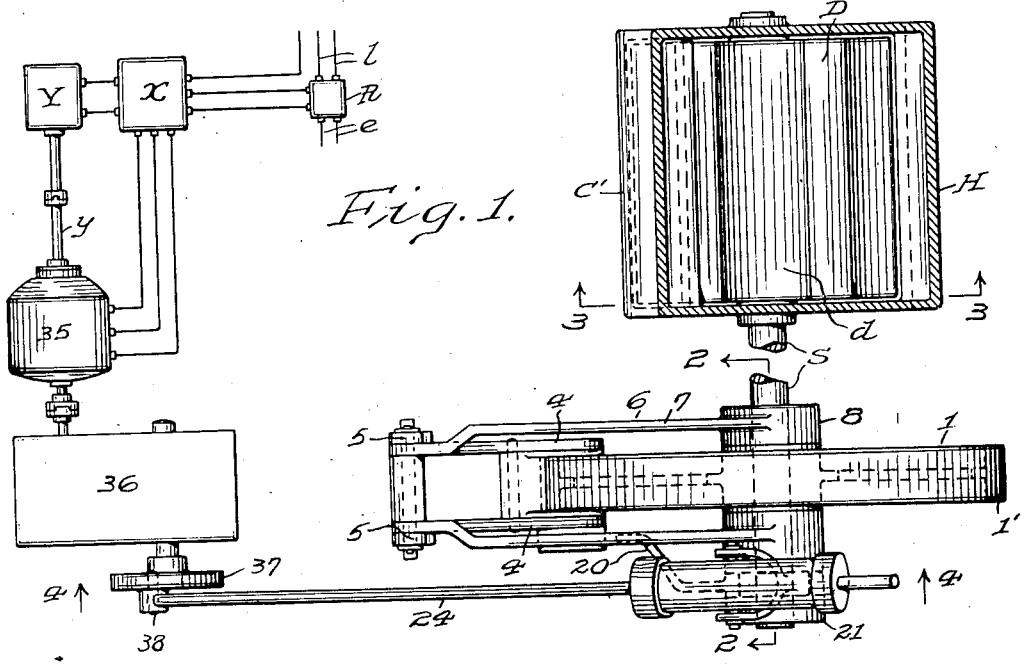
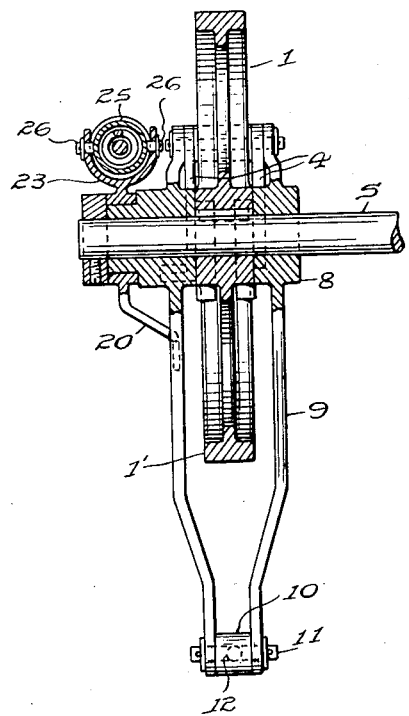
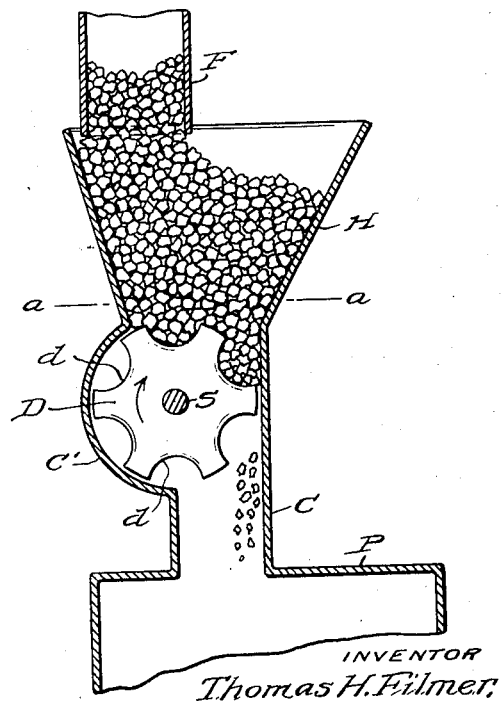
INVENTOR
Thomas H. Filmer
BY
ATTORNEYS
WITNESS Feb. 6, 1934.   T. H. FILMER   1,945,850
FUEL FEED CONTROL MECHANISM
Filed June 24, 1931   2 Sheets-Sheet 2

INVENTOR
Thomas H. Filmer.

WITNESS
F. J. Hartman.

BY
ATTORNEYS

Patented Feb. 6, 1934

1,945,850

UNITED STATES PATENT OFFICE 1,945,850

FUEL FEED CONTROL MECHANISM

Thomas H. Filmer, Youngstown, Ohio

Application June 24, 1931. Serial No. 546,441

4 Claims. (Cl. 236—15)

My invention is particularly directed to the provision of improved means for controlling feed of the fuel to a gas producer, furnace or the like in accordance with the temperature within its combustion chamber with the object of maintaining said temperature substantially constant.

It is well known that even though a given fuel be fed at a constant rate to the point at which it is consumed, the resultant temperature adjacent that point is not constant because of variations in the fuel itself, changes of draft during the consumption of the fuel, and other conditions encountered in operation, and as a consequence it is therefore impossible to maintain a constant temperature within the chamber to which the fuel is fed merely by feeding the latter at a constant rate. However, by suitably varying the rate of fuel feed to compensate for fluctuations in the rate at which consumption takes place, it is possible to maintain a substantially constant or predetermined temperature in the chamber; for example, in a heating furnace, more fuel is fed to the combustion chamber when the temperature tends to fall below and less when t tends to rise above the proper point, while in a gas producer, the rate of feed is increased when the temperature tends to rise above, or decreased when the temperature tends to fall below the desired point.

It is therefore a principal object of my invention to provide improved means for effecting this result, by the use of which the fuel feed can be regulated with such nicety that a more nearly constant temperature may be maintained within the furnace, gas producer or like device in which it is being burned than has heretofore been practicable under the conditions customarily encountered in practice and by the employment of the devices hitherto proposed for a generally similar purpose.

A further object of the invention is to provide mechanism of the character aforesaid which may be arranged for automatic operation, thus entirely dispensing with the necessity for substantially constant supervision and/or manual operation and control required by the mechanisms heretofore proposed for regulating the feed of a given fuel for the purpose of controlling the temperature in the combustion chamber in which it is burned.

Other objects, advantages and novel features of design, construction and arrangement comprehended by the invention are hereinafter more particularly pointed out or will be apparent to those skilled in the art as the description of the invention proceeds.

For convenience, I shall hereinafter refer more particularly to a form of the invention adapted for regulating the rate of feed of a solid fuel, such as coal, to a gas producer and as illustrated in the accompanying drawings, but it will be readily apparent that a substantially similar mechanism may be employed with equal facility for regulating the feed of such a fuel to a furnace or other apparatus, while the principles of the invention may also be utilized through the medium of suitable instrumentalities for controlling the position of a valve arranged to regulate the flow of a liquid fuel to a combustion chamber or the like in which it is to be burned.

Figure 5:
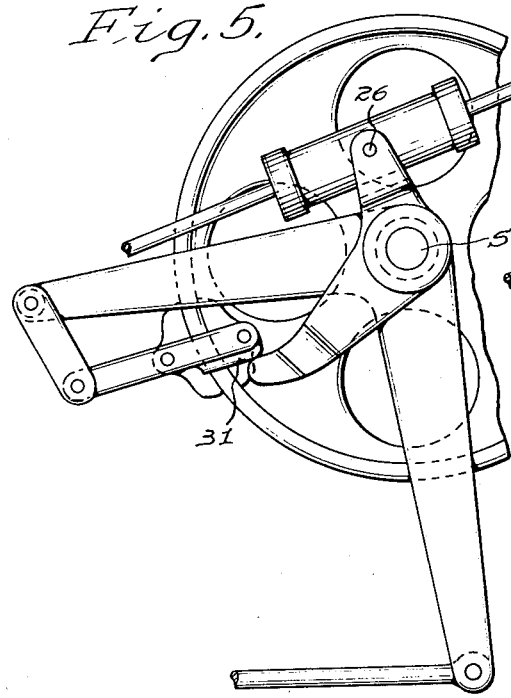
Figure 6:
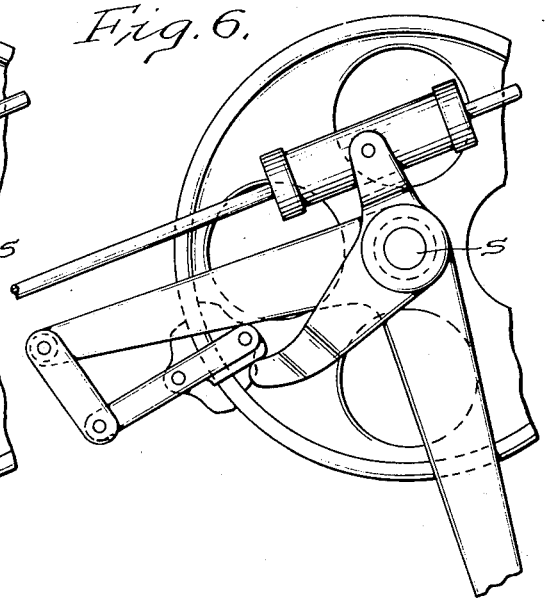

In the said drawings, Fig. 1 is a top plan view of the apparatus in association with a feed hopper and feed mechanism connected with a gas producer, the hopper being shown in horizontal section substantially on the plane $a$—$a$ in Fig. 3, and Fig. 2 is a vertical fragmentary section on the line 2—2 in Fig. 1 looking in the direction of the arrows. Fig. 3, which is on a considerably smaller scale than the preceding figures, is a fragmentary vertical section on line 3—3 in Fig. 1 looking in the direction of the arrows. Fig. 4 is a side elevation of certain of the parts shown in Fig. 1, with others in vertical section, as they would appear when viewed in the direction of the arrows 4—4 in said figure, and Figs. 5 and 6 are respectively fragmentary views in side elevation of certain of the parts shown in Fig. 4 in the positions which they occupy at different times during the cycle of operations of the machine. Like characters of reference are used to denote the same parts in the several figures.

More particularly, as best shown in Figs. 1 and 3, the latter of which, as stated, is on a smaller scale, the producer P is provided with a vertically extending chute C terminating at its upper end in a hopper H to which coal or other solid fuel is continuously supplied through feed pipe F or other suitable means. Beneath the hopper, the chute C is enlarged on one side as at C', and within the chamber thus formed is arranged a feed drum D secured on a horizontal shaft S by means of which it may be rotated in the direction of the arrows in Fig. 3. This drum is provided with a plurality of circumferentially spaced flutes $d$ adapted, when the shaft is rotated, to pick up fuel from the superjacent hopper and intermittently discharge it into the subjacent chute from which it passes to the producer as indicated. Thus, by turning the shaft S, metered quantities of fuel can be fed to the producer at time intervals determined by the speed of rotation of the shaft.

For effecting the requisite rotation of the shaft S, there is mounted thereon at a point suitably removed from the hopper, a feed wheel 1 adjacent the rim 1' of which is disposed a pair of shoes 2, 3, the former being located outside the rim and the latter within it. These shoes are repectively pivoted to a pair of levers 4, 4 on opposite sides of the wheel and extending outwardly from the periphery thereof where they are connected through the medium of generally vertically extending links 5, 5 to the outer ends of a pair of bell crank levers generally designated as 6. Each of these levers comprises an upper arm 7, a hub 8 and a lower arm 9, the hubs being loosely journaled on the shaft S on opposite sides of the feed wheel so that the levers can be moved relatively to the latter about the axis of the shaft. The lower ends of the arms 9 are oppositely inwardly bent as shown in Fig. 2 to receive between them a head 10 pivotally secured to the levers by a pin 11 and from which a connecting rod 12 extends to some suitable source of power (not shown) adapted to reciprocate the rod through a stroke of predetermined length.

Now, when the parts to which reference has just been made are in the positions best shown in Fig. 4, that is, when the connecting rod is at the limit of its rearward movement, i. e., to the left when viewed as in said figure, the arms 7 of the bell crank levers 6 are raised to their uppermost position and the shoes 2, 3 tightly gripped against the opposite faces of the rim of the feed wheel. Upon the ensuing forward movement of the connecting rod the lower arms 9 of the bell crank levers will be swung to the right from the position shown in Fig. 4, thus carrying the upper arms 7 downwardly and sliding the shoes over the rim of the wheel until, in the absence of means for preventing the shoes from continuing to the limit of their possible movement about the rim, the connecting rod reaches the limit of its forward movement. Thereupon on its return movement, the shoes are again caused to tightly grip the rim of the wheel and rotate it in the direction of the arrow in Fig. 4 through an arc determined by the amplitude of movement of the connecting rod, in turn rotating the shaft S and drum D with resultant feed of a predetermined amount of fuel into the chute C leading to the gas producer or furnace.

Mechanism of the general character of that just described has heretofore been in general use in connection with gas producers, furnaces and like apparatus, but in order to vary the length of the arc through which the feed wheel is rotated during each return movement of the connecting rod and thus bring about a corresponding regulation of the amount of fuel fed at each movement of the wheel, it has been necessary to control the length of the stroke of the rod by some manually operable device so that the services of an attendant were required to regulate the said stroke in accordance with any fluctuations taking place in the temperature of the chamber where the fuel was being burned. Since these changes usually take place relatively quickly, virtually the whole time and attention of one man is thus required to watch the thermometer or other temperature indicating device and then correspondingly regulate the feed, while irrespective of how carefully this is done, it has been impossible to hold the temperature substantially constant since the mechanism can not be regulated with sufficient nicety for that purpose under practical operating conditions.

In accordance with the present invention and with a view to overcoming these objections, I provide means, preferably automatically controlled in accordance with fluctuations in the temperature within the combustion chamber, to control the extent of movement imparted to the feed wheel at each full reciprocation of the connecting rod by limiting the distance which the shoes 2, 3 are carried about the periphery of the wheel at each forward movement of the rod, so that when a more rapid feed is required the shoes will be moved for a greater distance and vice versa. To this end, I dispose upon the shaft S a stop 20 comprising a hub 21 surrounding the shaft, an arm 22 extending angularly downward therefrom to a point adjacent that part of the rim of the feed wheel with which the shoes coact, and another arm 23, desirably provided with a yoke or fork at its upper end, extending generally upwardly from the shaft substantially at right angles to the arm 22. The arm 23 is suitably connected to an adjusting rod 24 extending angularly downward, the connection being preferably effected by disposing in the fork at the end of the arm 23 a cylinder 25 and connecting the latter to the arm by trunnions 26. This cylinder is provided at its upper end with a cap 27 and at its lower end with a cap 28, both of which are perforated for the passage of the rod 24 which extends entirely through the cylinder and is surrounded within the latter by a spring 29 bearing at its upper end against the cap 27 and at its lower against a collar 30 fixed on the rod. While the connection between rod 24 and stop 20 may if desired be made by means other than those just described, I prefer to employ the latter or some other equivalent yielding connection adapted to take up lost motion between the parts and also to minimize the shock or jar thereon when the shoes are brought into contact with the end of the arm 22 which acts to limit the extent of their counterclockwise or downward movement, as hereinafter described.

The lever 4 which is disposed on that side of the feed wheel on which the stop 20 is located, is provided with a desirably integral boss 31 extending into the path of the arm 22 and adapted to contact therewith to limit the downward movement of the adjacent end of the lever, the point of contact being of course determined by the adjusted position of the stop. Assuming the latter to be as shown in Fig. 4, it will be apparent that as the bell cranks 6 move counterclockwise during the forward stroke of the connecting rod, the boss 31 will ultimately engage the end of the arm 22 (Fig. 5) and if, as is the case under the assumed condition, the rod has not yet reached the end of its stroke, the shoes 2, 3 will thereafter shift relatively to each other until they reach substantially the positions shown in Fig. 6 at the termination of the forward stroke of the rod. Substantially coincident with the initiation of the return stroke, the shoes grip the rim of the wheel and operate to rotate it in a clockwise direction during the remainder of the said stroke, thus turning the feed drum D through a corresponding arc, while by shifting the rod 24 substantially axially in one direction or the other, the position of the arm 22 of the stop 20 may be adjusted to arrest the downward or anti-clockwise movement of the shoes earlier or later during the forward movement of the connecting rod 12, thus varying the amplitude of rotation of the feed wheel on each return movement of the rod.

The means which I employ for effecting the adjustment of rod 24 may be of any character adapted to effect the desired function, but preferably comprise a three-phase reversing motor 35 connected through a suitable reduction gear 36 to a crank disk 37 carrying a crank pin 38 to which the adjacent end of the rod 24 is connected. Thus, by rotating the crank disk through a limited arc in one direction or the other from the position shown in Fig. 4, it is possible to move the rod 24 substantially longitudinally so as to vary the adjusted position of the stop 20 as hitherto described.

This rotation of the crank disk is of course effected by causing the motor 35 to drive the reduction gear in one direction or the other, and in the preferred practice of the invention this is effected automatically in accordance with the temperature within the producer or other point to which the fuel is being fed through suitable electrical control means primarily actuated from a thermostat (not shown) or other device situated within the heated zone. Since the specific form of the electrical control apparatus forms no part of the present invention, extended description or more than diagrammatic illustration thereof (see Fig. 1) would be superfluous other than to say that the said mechanism is preferably so designed that upon a predetermined drop in temperature in the producer chamber or other point at which the thermostatic element is located, the motor will be actuated to rotate the crank disk for a predetermined arc in a direction (which will be clockwise when the parts are viewed as in Fig. 4) proper to raise the stop 20 and thus shorten the arc through which the feed wheel 1 is rotated for each reciprocation of the connecting rod, and to rotate the crank disk in the opposite direction through a corresponding arc when the said temperature rises above the desired point, and if the increase or decrease in the rate of fuel feed thereby effected is insufficient to bring the temperature substantially back to normal in a predetermined time, to then re-actuate the motor so as to turn the disk through a further limited arc in the same direction and thus further increase or decrease the rate of fuel feed until normal temperature conditions are restored, after which the control mechanism operates to restore and maintain the normal rate of feed until another departure therefrom is required.

The control mechanism will therefore generally embody in addition to the thermally actuated element in or adjacent the combustion chamber, a temperature recorder R disposed outside the combustion zone but interconnected with said element as by the wires e, a relay X between the recorder and the motor, and a control switch Y mechanically actuated from the latter by a shaft y, these several instrumentalities being suitably electrically interconnected with each other and by the line wires l with a source of current.

Under practical conditions of operation I have found that through the medium of my invention a much more accurate and satisfactory temperature control can be obtained than has hitherto been practicable with any other fuel feed control apparatus with which I am familiar, and particularly with the type to which I have herein referred in which the stroke of the connecting rod 12 or equivalent element is manually adjusted in accordance with the rate of feed desired, while the fact that my improved apparatus in its preferred embodiment is entirely automatic in action and operates with substantially no attention results in a material saving in the cost of operation as the substantially constant services of an attendant can be dispensed with.

While I have herein described and illustrated with considerable particularity one form of my invention which I have found extremely satisfactory for the performance of its intended function, I do not thereby desire or intend to limit myself to any particular structural details and arrangement of the various parts as they are capable of modification in many particulars, nor to the use of the invention for controlling the feed of any particular type of fuel to any particular type of apparatus, as it will be apparent to those skilled in the art that the invention is capable of application in present day industry to numerous types of apparatus and that, if desired, the principles thereof may be employed through the medium of suitable instrumentalities to regulate the feed of liquid as well as of solid fuel.

Having thus described my invention, I claim and desire to protect by Letters Patent of the United States:

1. The combination with fuel feed mechanism of the class described, comprising feed means, a feed wheel connected therewith, and means for positively turning the wheel intermittently in one direction through a limited arc, of a movable stop operable to control the length of the arc through which said wheel is turned, a rod, means providing a yielding connection between the rod and the stop when the rod is moved in one direction and a positive connection therebetween when the rod is moved in the opposite direction, and electrically controlled means operative to reciprocate the rod in correspondence with fluctuations in temperature at a given point to thereby control the fuel feeding rate by adjustment of the position of said stop.

2. In combination with fuel feeding mechanism comprising a rotatable shaft and feeding means carried thereby, an actuating wheel mounted on said shaft, spaced from said feeding means and operative to effect rotation of the shaft, a bell crank lever rotatably mounted on the shaft, means pivotally supported from one arm of said lever adapted to frictionally clamp the rim of said wheel when the lever is moved in one direction to thereby rotate the wheel and to move relatively to the wheel in sliding engagement therewith when the lever is moved in the opposite direction, an adjustable stop supported on the shaft adjacent said wheel and extending into the path of said last mentioned means to limit the movement thereof in said last mentioned direction and means operative to maintain substantially constant oscillatory motion of the lever.

3. The combination with fuel feeding mechanism of the class described comprising feeding means and a shaft adapted to rotatably support said means, of a wheel carried by said shaft and having an axially extending rim at its periphery, a pair of friction members respectively adapted to contact opposite surfaces of said rim, means for effecting movement of said members about said shaft alternately in opposite directions and adjustable means carried by the shaft and adapted to extend into the path of one of said members to thereby limit said movement thereof in one direction.

4. The combination with a gas producer, fuel feed mechanism comprising feeding means, a feed wheel connected therewith, and means for turning the wheel in one direction, of a movable stop operable to control the length of the arc through which said wheel is turned, a rod yieldably interconnected with said stop, and electrically controlled means operative to reciprocate said rod to increase the fuel feed as the temperature within the gas producer increases and to reduce said fuel feed as the said temperature decreases.

THOMAS H. FILMER.